United States Patent [19]

Patel

[11] Patent Number: 5,100,195

[45] Date of Patent: Mar. 31, 1992

[54] INSTALLATION OF A CONVERTIBLE TOP COVER ON A VEHICLE

[75] Inventor: Jayant M. Patel, Sylvania, Ohio

[73] Assignee: Wickes Manufacturing Company, Southfield, Mich.

[21] Appl. No.: 651,899

[22] Filed: Feb. 7, 1991

[51] Int. Cl.⁵ .................................................. B60J 7/00
[52] U.S. Cl. ...................................................... 296/107
[58] Field of Search ............... 296/107, 118, 104, 121; 135/119; 114/361

[56] References Cited

U.S. PATENT DOCUMENTS

| | | | |
|---|---|---|---|
| 2,469,958 | 5/1949 | Fowler | 296/105 |
| 2,569,724 | 10/1951 | Mackie et al. | 296/107 |
| 2,649,330 | 8/1953 | Schamel et al. | 296/107 |
| 2,708,137 | 5/1955 | Poelman | 296/107 |
| 2,747,928 | 5/1956 | Olivier et al. | 296/107 |
| 2,954,999 | 10/1960 | Fingerman et al. | 296/107 |
| 3,090,646 | 5/1963 | Johnson | 296/107 |
| 3,223,446 | 12/1965 | Coppock et al. | 135/119 X |
| 3,237,983 | 3/1966 | Hollar, Jr. | 296/137 |
| 3,503,101 | 3/1970 | Kolozsvary | 135/119 X |
| 3,606,448 | 9/1971 | Walker | 296/105 |
| 3,896,832 | 7/1975 | Montoya | 114/361 |
| 4,197,681 | 4/1980 | Holcombe | 135/119 X |
| 4,209,197 | 6/1980 | Fischer | 296/216 |
| 4,529,243 | 7/1985 | Kaltz et al. | 296/107 |
| 4,600,233 | 7/1986 | Boydston | 296/24 R |
| 4,611,849 | 9/1986 | Trenkler | 296/107 |
| 4,671,981 | 6/1987 | McLaughlin | 428/95 |
| 4,683,900 | 8/1987 | Carmichael | 114/361 X |
| 4,719,934 | 1/1988 | Mydans | 135/104 X |
| 4,741,571 | 5/1988 | Godette | 296/107 |
| 4,746,163 | 5/1988 | Muscat | 296/107 X |
| 4,768,317 | 9/1988 | Markham | 135/119 X |
| 4,877,044 | 10/1989 | Cantwell et al. | 135/104 |
| 4,883,206 | 11/1989 | Miller | 5/114 X |

FOREIGN PATENT DOCUMENTS 2220173 1/1990 United Kingdom ................ 296/107

OTHER PUBLICATIONS

J. C. Whitney & Co., "4-Way Convertible Tops", p. 68, Sep. 1986.

Primary Examiner—Margaret A. Focarino
Assistant Examiner—Gary C. Hoge
Attorney, Agent, or Firm—David A. Greenlee

[57] ABSTRACT

A convertible vehicle has a convertible top assembly movable between raised and lowered positions covering and opening the passenger compartment. The top assembly has an articulated frame comprising a header for engaging a vehicle windshield header in raised position, a plurality of transverse bows, and a fabric cover supported by the bows. The cover is attached to the frame by strips of hook-and-loop fastener material mounted on the top header and the transverse bows which engage mating strips of the material mounted on adjacent portions of the cover for interengagement to form attachment joints securing the cover to the frame. The rear edge of the cover is attached to a movable rear bow which seals against the vehicle body in one embodiment. In another embodiment the rear edge of the cover is attached to the periphery of the boot.

16 Claims, 4 Drawing Sheets

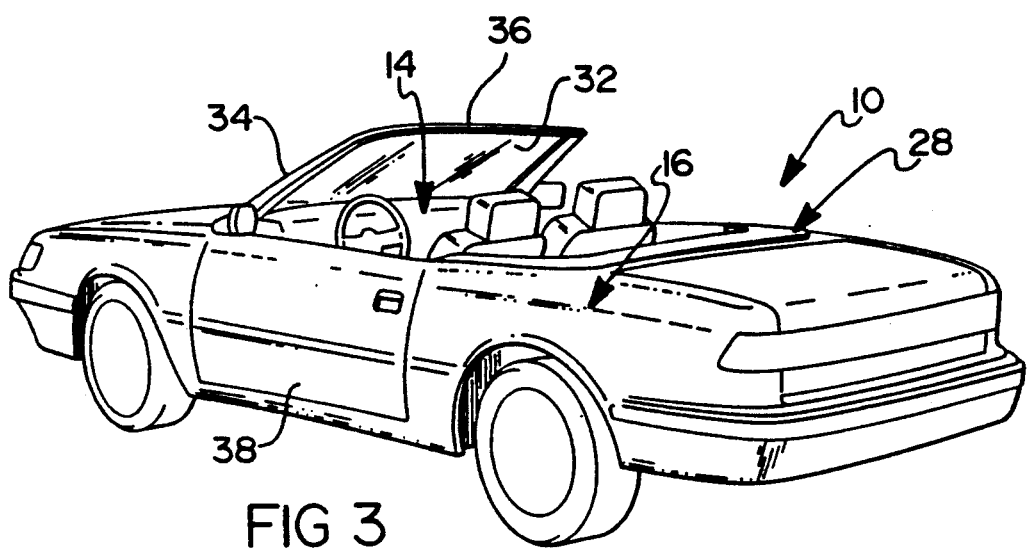
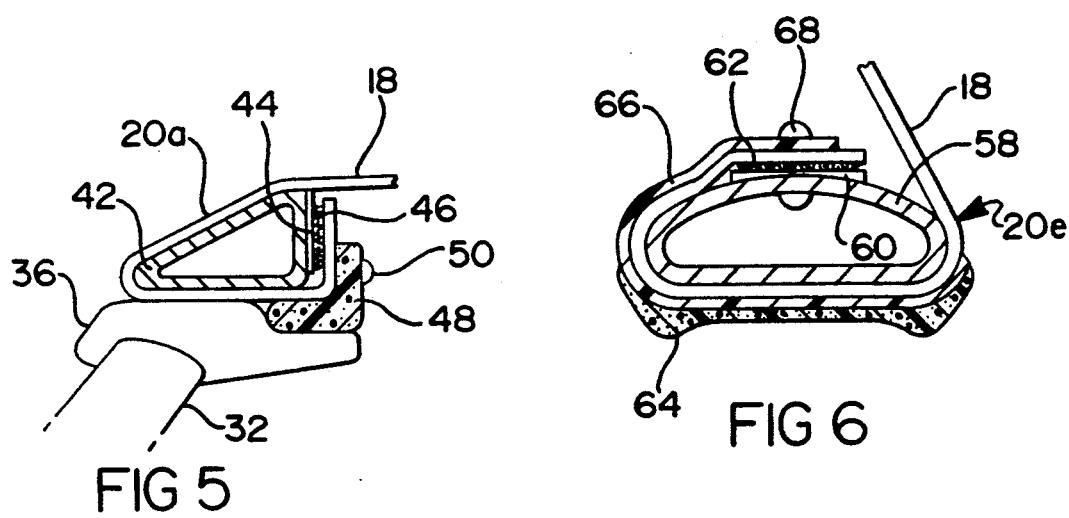
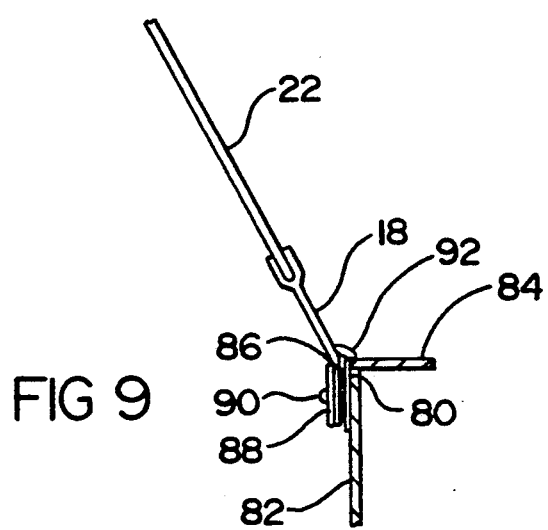

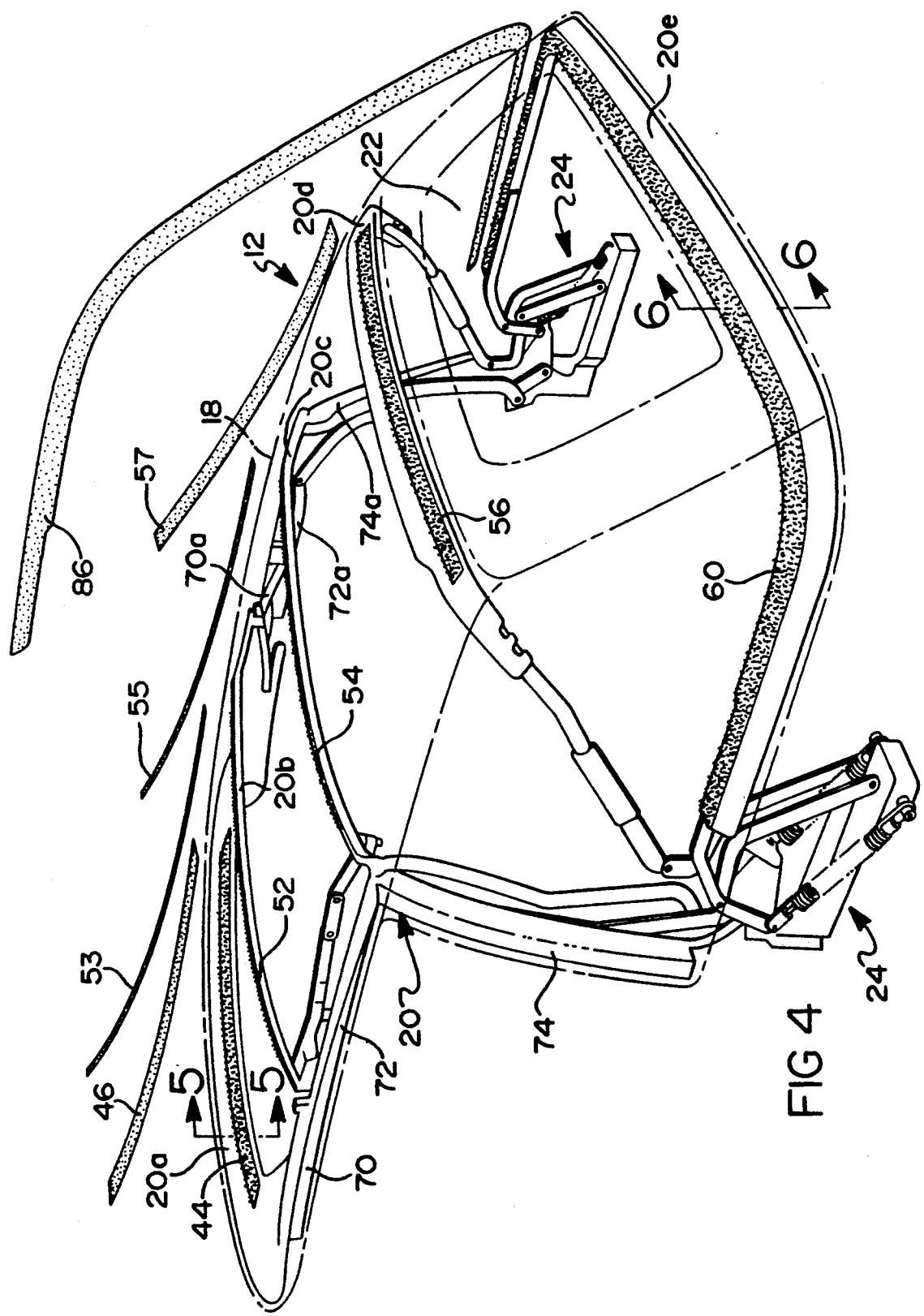

INSTALLATION OF A CONVERTIBLE TOP COVER ON A VEHICLE

FIELD OF THE INVENTION

This invention relates generally to vehicle convertible tops assemblies and, more particularly, to the installation of the fabric cover to the vehicle body and to the articulated top frame.

BACKGROUND OF THE INVENTION

A convertible automobile comprises an open vehicle body that mounts an articulated frame or top stack, that is movable by manual or power means between a folded lowered or stored position, which opens the passenger compartment, and an unfolded raised position, which covers the passenger compartment. In lowered position, most convertible tops occupy a storage compartment rearwardly of the passenger compartment known as the storage well or boot. The top stack usually comprises a header, that engages the vehicle windshield header in raised position, a rear bow that seals against the vehicle body, and a plurality of intermediate bows.

A fabric cover is secured to the top header and to the rear bow of the top stack or to the body around the periphery of the storage well. The cover includes a rear opening that mounts a glass or plastic backlight. The cover usually is secured to the intermediate bows to prevent ballooning of the top, which otherwise would occur due to the pressure differential between the inside and outside of the vehicle caused by the aerodynamics of the vehicle at speed.

The cover is configured to seal against the vehicle side windows when both are raised. Combined with its attachment to the header and rear rail, this forms a seal between the top periphery and the vehicle body to prevent the ingress of rain and wind to the passenger compartment. It also provides some security against unauthorized vehicle entrance, unless, of course, the top fabric is cut.

In some convertible tops, such as is shown in U.S. Pat. No. 4,741,571 to Godette, the rear bow is movable away from the body during top raising and lowering to enable movement of a hard boot cover beneath the rear bow to cover the boot in both top raised and lowered positions. To accommodate this movement, the top fabric is secured to the rear bow.

More conventionally, the rear of the top fabric is secured directly to the body and the boot is open to the passenger compartment when the top is raised. When the top is lowered, the boot may is conventionally covered by attachment of a separate soft or hard cover to the vehicle body around the periphery of the boot.

Trimming of the top, or attachment of the fabric cover to the frame and to the vehicle, is a tedious and exacting process. The fabric cover is conventionally secured to the top header by stapling or nailing the fabric to a plastic tack strip carried by the header. Similarly, covers that are secured to the rear bow are nailed to a tack strip carried by the rear bow.

In those vehicles where the fabric cover is attached directly to the body, the fabric is tacked to a similar tack strip or clamped to the body by a clamping strip that is screwed into the body at closely spaced intervals near the vehicle belt line.

The fabric cover carries sewn-in lateral material loops adjacent the intermediate bows which receive metal lister bars that are attached to the bows. This keeps the fabric cover closely secured to the frame to prevent ballooning during vehicle operation.

In these arrangements, it requires skill to assure that the tacking and/or clamping is done accurately, or the fabric cover will not have a smooth fitted appearance, free of such defects as wrinkles or bulges. If such defects do occur, reworking of the top requires prying the tacks off and retacking of the fabric cover. Much hand fitting on a cut-and-try basis is normally required to assure a good fit of the material to the top frame and to the vehicle body.

Another drawback to this technique is that the tacking process violates the integrity of the fabric by weakening it. Reworking puts more holes in the fabric, further weakening it.

Convertible top covers, being fabric, have a finite life significantly shorter than that of the vehicle. Thus, one or more replacement tops may need to be installed during a convertible vehicle's life. This top replacement process is more laborious than the original installation, since it requires tearing out the old top cover and installing the new cover in the same manner as the original installation.

Attempts have been made to simplify the top installation and reinstallation process. U.S. Pat. No. 2,954,999 to Fingerman et al discloses a process in which the rear fabric edge is attached to a trim strip which is then screwed to the periphery of the boot.

U.S. Pat. No. 3,090,646 to Johnson relates a method of sewing the rear fabric edge of the cover to a retainer cord which is inserted in a groove in a movable rear bow and retained there by an adjacent rubber weatherstrip and a clamping trim strip. However, this arrangement presupposes that the fabric cover is dimensioned correctly, which is often not the case.

U.S. Pat. No. 3,237,983 relates a method for attaching the fabric cover to the top header which involves inserting a plurality of nails through the cover fabric into preformed slots.

Although the above top attaching methods present some improvement, they still do not assure a quality fit of the fabric cover to the vehicle body and top frame and are inefficient in requiring too much skilled labor.

It would be desirable to provide a system of convertible top trimming that is much simpler and quicker than current trimming methods and facilitates the correction of installation errors. It would also be desirable to provide such a system that requires a much lesser skill level of top installation personnel than is now required to trim convertible tops, either originally or replacement.

SUMMARY OF THE INVENTION

It is therefore an object of this invention to provide a system of trimming a vehicle convertible top that is simple, time-saving and enables easy rework to correct installation errors.

In accordance with this invention, a convertible vehicle having an open passenger compartment and a convertible top assembly movable between a raised position which covers the passenger compartment and a lowered position folded within a storage well which opens the passenger compartment, in which the top assembly has an articulated frame comprising a header for engaging a vehicle windshield header in raised position, a plurality of transverse bows, and a fabric cover supported by the bows, is provided with improved means for securing the cover to the frame. This improved securing means comprises strips of mating hook-and-loop fastener material mounted on the top header and on the front edge of the cover for interengagement to secure the front of the cover to the header.

In one embodiment for a convertible top having the rear edge of its top fabric attached directly to the periphery of the top storage well, strips of mating hook-and-hoop fastener material are mounted on the rear edge of the cover and on the periphery of the storage well for interengagement to secure the rear of the cover to the vehicle.

In another embodiment for a convertible top having a movable rear bow, which engages the vehicle body in top raised and lowered positions, and strips of mating hook-and-loop material are mounted on the rear edge of the cover and on the rearmost transverse bow for interengagement to secure the rear of the cover to said bow to seal the rear of the cover to the vehicle body.

In a preferred version of both the aforementioned embodiments, strips of mating hook-and-loop fastener material are mounted on the transverse bows and on the fabric cover adjacent the bows to secure the cover to the bows.

In all these embodiments, top installation personnel can quickly and accurately secure the fabric cover to the top mechanism and to the vehicle body. Adjustments of the fabric cover in the top mechanism are simply accomplished by merely separating and re-adhering the strips of hook-and-loop fastener material to each other. After the appropriate fit is attained, trim strips are easily and quickly attached to assure the integrity of the hook-and-loop joints. With this arrangement, the integrity of the fabric is maintained because it has not been repeatedly pierced by screws or nails as previously.

These and further features of this invention will become apparent upon reference to the following detailed description of the invention which is illustrated in the accompanying drawings, in which:

BRIEF DESCRIPTION OF THE DRAWINGS

FIG. 3 is a view similar to FIG. 1, showing the vehicle with the top lowered;

FIG. 4 is an enlarged perspective view of the top assembly illustrating means mounting the fabric cover to the frame, according to this invention, with the fabric cover shown in phantom lines to better show details;

FIG. 5 is an enlarged sectional view taken along line 5—5 of FIG. 4;

FIG. 6 is an enlarged sectional view taken along line 6—6 of FIG. 4;

FIG. 9 is an enlarged sectional view, taken along line 9—9 of FIG. 8.

DETAILED DESCRIPTION OF THE INVENTION

Figure 1:
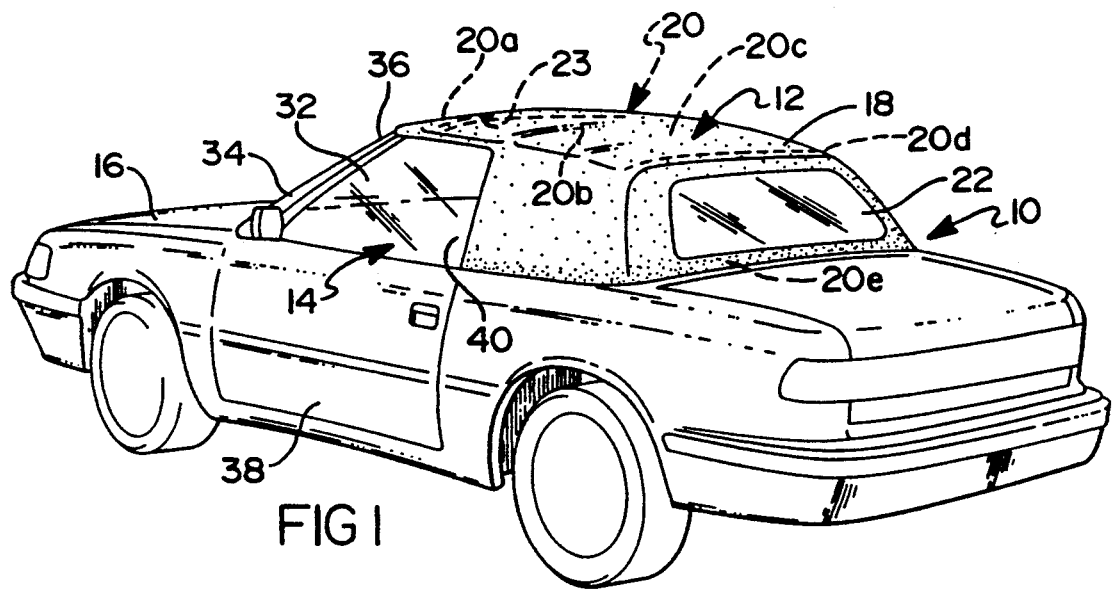
FIG. 1 is a perspective view of a convertible vehicle having a fabric top cover attached in accordance with one embodiment of this invention, with the top raised.
Figure 2:
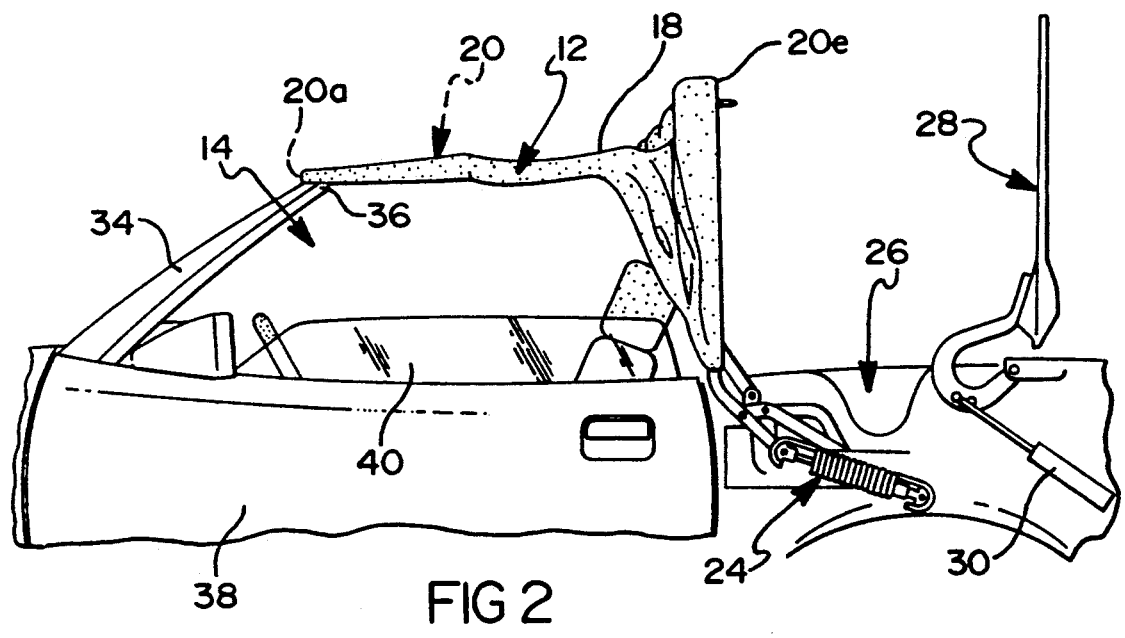
FIG. 2 is a partial side view of the convertible vehicle of FIG. 1, with the rear bow and the tonneau raised preparatory to lowering the top.

Referring now to FIG. 1 of the drawings, a convertible vehicle 10 has a retractable top assembly 12 which selectively closes a passenger compartment 14 in the vehicle body 16. Top assembly 12 comprises a fabric cover 18 supported by an articulated frame 20. The frame 20 comprises a transverse header 20a, transverse bows 20b, 20c, 20d, and a rear bow 20e. The top cover 18 mounts a backlight 22.

Top assembly 12 is movable by a power mechanism 24 (shown schematically) between the raised position of FIG. 1, in which it covers compartment 14, and the lowered position of FIG. 3, opening the passenger compartment. The power mechanism and the structure of frame 20 are preferably as disclosed in co-pending application Ser. No. 425,271, filed Oct. 23, 1989 by Roderick C. Fischbach and owned by the assignee herein.

In its lowered position, top assembly 12 is stored in a storage well, or boot, 26 rearwardly of the passenger compartment 14. Boot 26 is closed in both the raised and lowered positions of top assembly 12 by a cover, or tonneau, 28 that is preferably operated by a power cylinder 30. Details of the operation of the top assembly and the tonneau can be found in the aforementioned co-pending Fischbach application.

The vehicle mounts a windshield 32 in a frame 34 at the front of passenger compartment 14. Frame 34 includes a top transverse header 36 which is engaged by top header 20a in the top raised position. The vehicle includes side doors 38 which mount side windows 40 for movement between raised and lowered positions to further close and open passenger compartment 14. Top cover 18 is attached to the top header 20a, the transverse bows 20 b-d, and rear bow 20e in a manner according to this invention as described below. In raised position, top assembly sealingly engages windshield header 36, the edges of windows 40, and the vehicle body adjacent tonneau 28 to provide a weather seal for passenger compartment 12.

The attachment of fabric cover 18 to articulated top frame 20 will now be described with reference to FIGS. 4, 5 and 6. This attachment utilizes hook-and-loop fastening system, of which VELCRO ® is a well-known brand. In this fastening system a strip of material comprising thousands of tiny, flexible hooks is pressed against a strip of mating material comprising thousands of tiny, flexible loops. The thousands of hooks engage thousands of the loops to secure the strips together with a surprisingly strong adhesive force. This force makes it difficult to pull the strips directly apart; rather, the strips can more easily be peeled apart.

Strips of the mating hook-and-loop fastener material are mounted on the top frame and on adjacent portions of the fabric cover to secure the cover to the frame. It matters not whether the strips of hook material are mounted on the frame or on the cover, so long as the strips of loop material are mounted on the other adjacent surface.

As seen in FIG. 5, the top header 20a comprises a transverse metal channel 42 having an elongated transverse strip of loop material 44 adhesively secured to its rear side. The front edge of cover 18 has a strip of mating hook material 46 sewn or adhesively bonded to its underside. Strips 44 and 46 are pressed together to interengage and form an attachment joint securing the front edge of cover 18 to header 20a.

A transverse rubber seal strip is secured to header 20a by spaced fasteners 50 and is compressed against windshield header 36 by conventional clamping means (not shown) to prevent the ingress air and moisture. Fasteners 50 extend through the attachment joint to assure the integrity of the joint by preventing intentional or inadvertent disassembly by peeling strip 46 away from strip 44. As mentioned above, strip 44 could be the hook material and strip 46 could be the loop material. In either event they together comprise an attachment joint of mating hook-and-loop fastener material.

In a similar fashion, transverse bows 20b, 20c and 20d are provided with transverse strips of hook material 52, 54 and 56, respectively, as shown in FIG. 4. These strips interengage with transverse strips of loop material (not shown) which are similarly sewn or adhesively bonded to adjacent portions of cover 18.

As seen in FIG. 6, rear bow 20e comprises a metal channel 58 which mounts an elongated strip 60 of loop material on its upper side. The rear edge of cover 18 has a strip 62 of mating hook material sewn or adhesively bonded to its underside. Strips 60 and 62 are pressed together to interengage and form an attachment joint for the rear bow and the rear edge of the cover 18.

An elongated rubber seal 64 is provided for compression against the vehicle body 16 beneath rear bow 20e to seal the passenger compartment 14. Seal 64 is mounted on a supporting trim strip 66 that curves around channel 58 to attachment by spaced fasteners 68 to the channel. Fasteners 68 extend through the attachment joint formed by strips 60 and 62 to assure its integrity against inadvertent or intentional disassembly by peeling apart.

The use of the mating strips of hook-and-loop fastener material assures that cover 18 fits securely against frame 20. Thus, in the top raised position, side rails 70, 70a, 72, 72a 74 and 74a will seal against the side windows 40 by any conventional sealing means known in the art to combine with cover 18 and seals 48 and 64 to seal the passenger compartment.

One advantage attained by the use of the mating strips of hook-and-loop fastener material is that the time required to trim the top is significantly reduced. The header attachment is made first, followed sequentially rearwardly by attachment of the bows and concluding with the securing of the rear edge of the cover to the rear bow.

Should a wrinkle or bulge occur during top trimming, the cover is merely peeled back to the problem area and a correction is made. The strips of hook-and-loop fastener material preferably are of sufficient width to permit longitudinal adjustment of the cover on the frame so that full interengagement of the mating strips is not require for a secure attachment joint. The rear cover-mounted strip 62 should be sufficiently wide so that any variance in frame geometry of fabric length can be accommodated by overlapping or underlapping the strips 60 and 62. The underlapping or overlapping is cosmetically hidden by the overlying trim strip 66.

Figure 7:
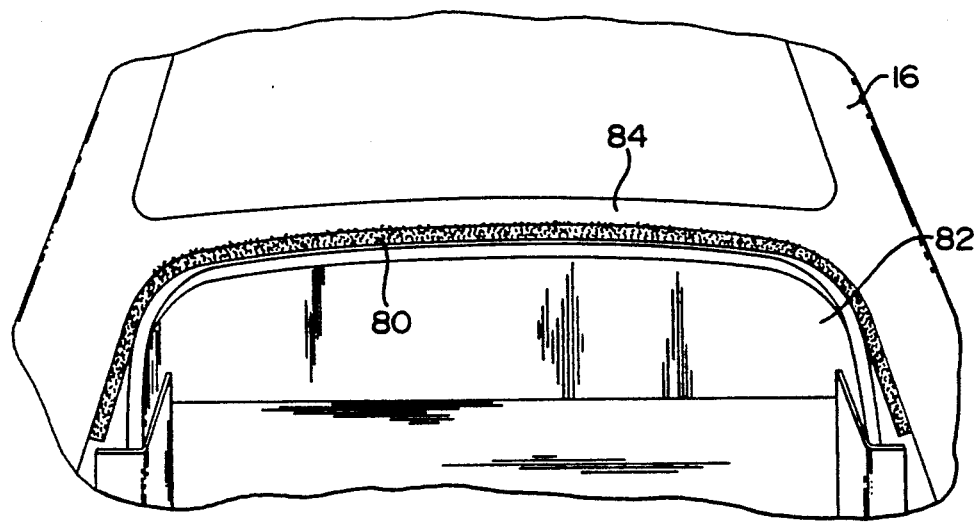
FIG. 7 is an interior view of the boot area of another convertible vehicle illustrating another embodiment of this invention, shown prior to installation of the top and its fabric cover.
Figure 8:
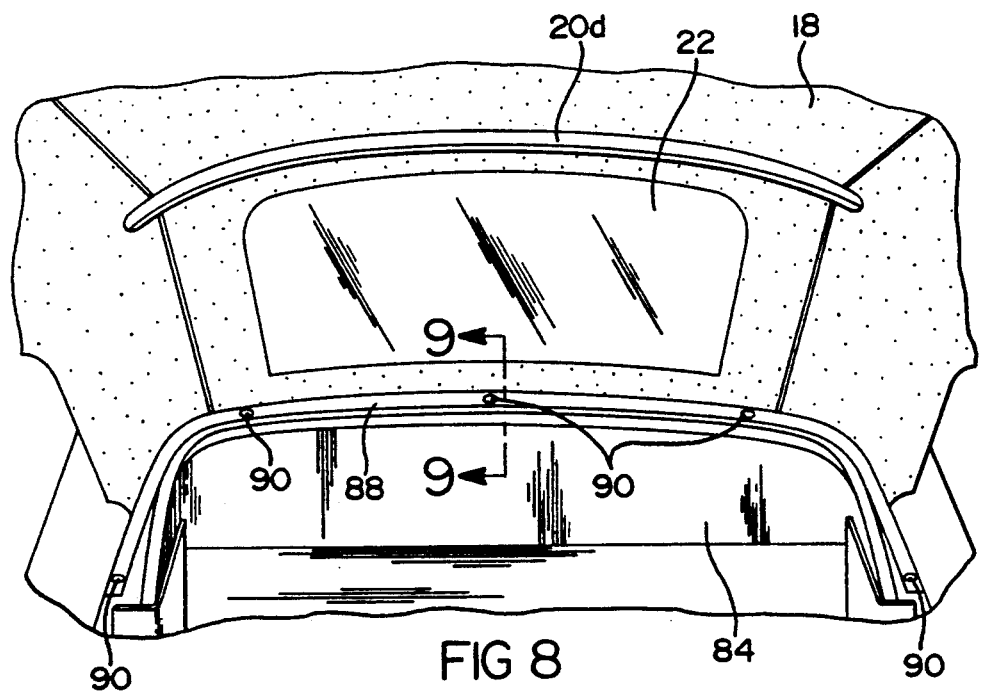
FIG. 8 is a view similar to FIG. 7, shown after installation of the top and its fabric cover.

FIGS. 7, 8 and 9 illustrate another embodiment of this invention applied to a convertible vehicle having the rear of the top fabric cover attached to the vehicle body at the periphery of the boot. This arrangement is commonly used in convertible vehicles and eliminates the movable rear bow in favor of permanently securing the rear edge of the top cover 18 to the vehicle body.

The boot 26 has a strip of loop material 80 secured to the upper peripheral edge of a wall 82 surrounding the boot adjacent the rear deck 84 of the vehicle body 16.

The rear edge of the cover 18 has a strip 86 of mating hook material sewn or adhesively bonded to its top side. Strips 80 and 86 are pressed together to interengage and form an attachment joint for the vehicle body and the rear edge of the cover 18. A trim strip 88 overlies the attachment joint. Fasteners 90 engage the trim strip 90 and extend through the attachment joint to engagement with wall 84 to assure the integrity of the joint. This prevents intentional or inadvertent disassembly of the rear edge of cover 18 from boot wall 82 by peeling strip 86 away from strip 80. Adjustments to the top trim would be made as above described, with strip 86 overlapping or underlapping strip 80. A seal strip 92 overlies the outer juncture of cover 18 and the top edge of boot wall 84 to provide a weather seal.

The loop fastener strip could alternatively be mounted on the rear deck 84 immediately adjacent boot 26. In this event, strip 86 of hook material would be mounted on the underside of cover 18, with a seal/retainer strip overlying the joint.

In all of the embodiments disclosed, removal of the cover 18 for replacement when worn is simply accomplished by removing the strip 48 at the front of the top and either of strips 62 or 88 from the rear of the top. Upon removal of these cover strips, the cover 18 can be quickly peeled off of frame 20. Reinstallation of a new top is as described above.

Although several embodiments of this invention have been disclosed, all of them utilize mating strips of hook-and-loop fastener material to secure the fabric cover to the articulated frame of a convertible top assembly. This arrangement greatly facilitates trimming of the top.

I claim:

1. In a convertible vehicle having an open passenger compartment and a convertible top assembly movable between a raised position covering the passenger compartment and a lowered position folded within a storage well opening into the passenger compartment, said top assembly having an articulated frame comprising a header for engaging a vehicle windshield header in raised position, a plurality of transverse bows, and a fabric cover supported by the bows, improved means for securing the cover to the frame, comprising:
    strips of mating hook-and-loop fastener material mounted on the top header and on the front edge of the cover for interengagement to form an attachment joint securing the front of the cover to the top header.

2. The securing means of claim 1, including a seal strip mounted on the top header for sealing the top header to the windshield header and to assure integrity of the attachment joint.

3. The securing means of claim 1, including strips of mating hook-and-loop fastener material mounted on the transverse bows and on the cover adjacent the bows to form attachment joints securing the cover to the bows.

4. The securing means of claim 1, further including strips of mating hook-and-loop fastener material mounted on the rear edge of the cover and on the periphery of the storage well for interengagement to form a second attachment joint securing the rear of the cover to the vehicle.

5. The securing means of claim 4, including a trim strip mounted over the second attachment joint to assure its integrity.

6. The securing means of claim 4, including strips of mating hook-and-loop fastener material mounted on the transverse bows and on the cover adjacent the bows to secure the cover to the bows.

7. The securing means of claim 1, wherein the rearmost transverse bow engages the vehicle body in top raised and lowered positions, and including strips of mating hook-and-loop material mounted on the rear edge of the cover and on the rearmost transverse bow for interengagement to secure the rear of the cover to said bow.

8. The securing means of claim 7, including a seal strip mounted on the top header for sealing the top header to the windshield header and to assure integrity of the attachment joint.

9. The securing means of claim 8, including a seal strip mounted on the rearmost bow over attachment joint the for sealing the rearmost bow to the vehicle body and to assure integrity of the attachment joint.

10. The securing means of claim 9, including strips of mating hook-and-loop fastener material mounted on the transverse bows which are intermediate the header and the rearmost bow and on the cover adjacent the bows to secure the cover to the bows.

11. The securing means of claim 7, including strips of mating hook-and-loop fastener material mounted on the transverse bows which are intermediate the header and the rearmost bow and on the cover adjacent the bows to secure the cover to the bows.

12. In a convertible vehicle having an open passenger compartment and a convertible top assembly movable between a raised position covering the passenger compartment and a lowered position folded within a storage well opening into the passenger compartment, said top assembly having an articulated frame comprising a header for engaging a vehicle windshield header in raised position, a plurality of transverse bows, and a fabric cover supported by the bows, improved means for securing the cover to the frame, comprising
strips of mating hook-and-loop fastener material mounted on the top header and on the front edge of the cover for interengagement to form an attachment joint securing the front of the cover to the top header,
a seal strip mounted on the top header for sealing the top header to the windshield header and to assure integrity of the attachment joint, and
further strips of mating hook-and-loop fastener material mounted on each of the transverse bows and on the cover adjacent said bows for interengagement to form further attachment joints securing the cover to the frame.

13. The securing means of claim 12, wherein said strips each have sufficient width to enable adjustable positioning of the cover relative to the frame, while assuring interengagement of the mating strips.

14. In a convertible vehicle having an open passenger compartment and a convertible top assembly movable between a raised position covering the passenger compartment and a lowered position folded within a storage well opening into the passenger compartment, said top assembly having an articulated frame comprising a header for engaging a vehicle windshield header in raised position, a plurality of transverse bows, and a fabric cover supported by the bows, improved means for securing the cover to the frame, comprising:
strips of mating hook-and-loop fastener material mounted on a transverse bow and on the cover adjacent said bow for interengagement to form an attachment joint securing the cover to the frame.

15. The securing means of claim 14, further including strips of mating hook-and-loop fastener material mounted on each of the transverse bows and on the cover adjacent said bows for interengagement to form attachment joints securing the cover to the frame.

16. In a convertible vehicle having an open passenger compartment and a convertible top assembly movable between a raised position covering the passenger compartment and a lowered position folded within a storage well opening into the passenger compartment, said top assembly having an articulated frame comprising a header for engaging a vehicle windshield header in raised position, a plurality of transverse bows, and a fabric cover supported by the bows, improved means for securing the cover to the vehicle body, comprising
strips of mating hook-and-loop fastener material mounted on each of the transverse bows and on the cover adjacent said bows for interengagement to form attachment joints securing the cover to the frame, and
strips of mating hook-and-loop fastener material mounted on the rear edge of the cover and on the periphery of the storage well for interengagement to form an attachment joint securing the rear of the cover to the vehicle.

* * * * *